United States Patent [19]

West

[11] Patent Number: 5,767,916
[45] Date of Patent: Jun. 16, 1998

[54] METHOD AND APPARATUS FOR AUTOMATIC PIXEL CLOCK PHASE AND FREQUENCY CORRECTION IN ANALOG TO DIGITAL VIDEO SIGNAL CONVERSION

[75] Inventor: Michael G. West, Portland, Oreg.

[73] Assignee: In Focus Systems, Inc., Wilsonville, Oreg.

[21] Appl. No.: 760,517

[22] Filed: Dec. 5, 1996

Related U.S. Application Data

[63] Continuation-in-part of Ser. No. 614,511, Mar. 13, 1996.

[51] Int. Cl.$^6$ .................................................. H04N 5/12
[52] U.S. Cl. ............................................ 348/537; 348/536
[58] Field of Search .................................. 348/536, 537, 348/539, 540, 541, 542, 543, 544, 556, 558, 500, 511, 512, 518; 358/158; 327/113, 115, 117, 147, 149, 151; 375/355, 360, 371; H04N 5/12, 5/04

[56] References Cited

U.S. PATENT DOCUMENTS

| | | | |
|---|---|---|---|
| 4,905,085 | 2/1990 | Faulhaber ............................... | 358/148 |
| 5,404,173 | 4/1995 | Parrish et al. ........................... | 348/537 |
| 5,539,473 | 7/1996 | Kommrusch et al. .................. | 348/537 |
| 5,657,089 | 8/1997 | Onagawa ................................ | 348/537 |

*Primary Examiner*—Christopher C. Grant
*Attorney, Agent, or Firm*—Timothy M. Carlson

[57] ABSTRACT

A method for producing a digital video signal from an analog video signal, the analog video signal including an analog video data signal that is raster scanned in lines across a CRT screen to form consecutive frames of video information, the raster scanning controlled by use of a horizontal synchronizing signal ($H_{sync}$) that controls a line scan rate, and a vertical synchronizing signal ($V_{sync}$) that controls a frame refresh rate, to produce consecutive frames of video information, wherein the digital video signal is produced by generating a pixel clock signal with pixel clocks for repetitively sampling instantaneous values of the analog video data signal, and digitizing the analog video data signal based on the pixel clock sampling. An expected width E, measured in number of pixel clocks, of a video image producible by the analog video signal is estimated, and an actual width W, measured in number of pixel clocks, of the video image producible by the analog video signal is calculated. The actual width W is compared with the expected width E. When E does not equal W, at least one of a frequency component and a phase component of the pixel clock signal is adjusted until E equals W. The phase of the pixel clock signal may also be corrected by selecting a selected pixel component, and iteratively adjusting the pixel clock phase until a jitter zone of a pixel clock pulse is centrally registered with the selected pixel component.

20 Claims, 6 Drawing Sheets

METHOD AND APPARATUS FOR AUTOMATIC PIXEL CLOCK PHASE AND FREQUENCY CORRECTION IN ANALOG TO DIGITAL VIDEO SIGNAL CONVERSION

The present application is a continuation-in-part of application Ser. No. 08/614,511, filed on Mar. 13, 1996.

FIELD OF THE INVENTION

The present invention pertains to converting an analog video signal to a digital video signal, and in particular to automatically adjusting phase and frequency of a clock for converting an analog signal to a digital signal.

BACKGROUND AND SUMMARY OF THE INVENTION

Presentations using multimedia projection display systems have become popular for purposes such as sales demonstrations, business meetings, and classroom sessions. In a common mode of operation, multimedia projection display systems receive analog video signals from a personal computer (PC). The video signals represent still, partial-, or full-motion display images of the type rendered by the PC. The analog video signals are converted into digital video signals to control a digitally-driven display object, such as a transmissive liquid crystal display (LCD), to form the display images for projection onto a display screen.

Two common types of multimedia projection display systems are LCD projectors and LCD projection panels. An LCD projector includes a transmissive LCD, a light source, and projection optics to form ad project display images in the manner describes above. An LCD projection panel includes a similar transmissive LCD to form the display image, but operates with a conventional overhead projector (OHP) having a light source and projection optics, to project the display image onto a display screen. Examples of such LCD projectors and LCD projection panels are sold under the respective trademarks LITEPRO and PANELBOOK by In Focus Systems, Inc. of Wilsonville, Oreg., the assignee of the present application.

One desirable feature for multimedia display systems is compatibility with the various analog video signal modes generated by various PC's. These modes generally range from 640×480 to 1600×1200 resolutions provided at image refresh rates of 60 to 100 Hz. The resolution expresses the number of horizontal and vertical pixel elements that can be turned on and off. Given the variety of resolution modes, multimedia display systems include an interface that converts analog video signals of various modes to digital video signals capable of controlling the LCD.

In general, analog video signals comprise an analog image data signal for each of the primary colors red, green and blue, and digital timing signals, which may include a pulsed horizontal synchronizing signal ($H_{sync}$) and a pulsed vertical synchronizing signal ($V_{sync}$) or a composite sync signal. The individual analog color signals are generated from bit data in a memory portion of the PC, using three digital-to-analog (D/A) converters, one for each of red, green and blue. FIG. 1 a shows an exemplary analog signal waveform 1, with plateau regions (pixel data components) 2 that correspond to the color level of individual pixels of the image display. Consecutive pixel data components 2 are connected by signal transition regions 3. The digital timing signal controls the raster-scanning of the analog video data signals across the monitor screen. The $H_{sync}$ pulse controls the horizontal raster scan rate, and the $V_{sync}$ pulse controls the image (or frame) refresh rate. In the case of a composite sync signal, a conventional sync separator is first used to obtain the horizontal and refresh signals.

As shown in FIG. 1d, each video frame 9 is usually produced to have a central active video region 11 surrounded by an inactive ("blanked") margin 13. The resolution refers to only the pixels in the active video region.

Because the LCD used in multimedia display systems require digital video signals, either the LCD or the system normally has an analog to digital (A/D) signal converter for converting the PC-generated analog video signals into a digital format suitable for driving the LCD. The A/D signal converter is usually combined with a phase-locked loop (PLL), which may comprise a phase comparator, a low-pass loop filter, and a voltage-controlled oscillator (VCO) formed in a loop to generate a feedback signal that locks into $H_{sync}$. In order to generate a selected multiple n of clock pulses for each period of $H_{sync}$, a divide-by-n counter is added to the feedback loop between the VCO output and the phase comparator.

An example of a pixel clock waveform 4 is shown in FIG. 1a. The number n of individual pixel pulses per $H_{sync}$ pulse may be set by reference to the resolution mode of the analog video source. To set the resolution mode, certain characteristics of the analog video signal, such as $H_{sync}$ and $V_{sync}$ may be used to refer to a mode look-up table stored in the display system CPU. The number n should be set to equal the number of pixel data components in each horizontal line of the scanned analog signal, including those active video data region 11 and the blanked margin regions 13 (see FIG. 1d) on either side of the active region. For example, for a screen resolution of 640×480, n may be set at about 800 to include the blanked regions on either side of the 640 pixel-wide active video data region. Thus, the pixel clock would sample the continuous stream of analog image data 800 times along each horizontal line of the frame.

FIG. 1a shows the desired relationship between the analog video data signal 1 and the pixel clock signal 4. The number n of pixel clocks 5 is set to establish a one-to-one relationship between pixel clock pulses 5 and pixel data components 2 of the analog data signal 1. This one-to-one relationship requires that the pixel clock signal frequency be equal to the analog video data signal frequency. Under this relationship, each pixel data component 2 of the analog signal is sampled by a single pixel clock pulse 5, which reads the instantaneous voltage value of the pixel data component so that it can be digitized. Since the pixel clock pulses 5 have "jitter" zones 6 at their leading and trailing edges, the clock pulses 5 should be registered with the centers of the pixel data components 2, so that the sampling is not randomly pushed by the jitter into the transition regions 3 of the analog video signal.

The stream of digitized values form the digital video data signal, which is addressed to the LCD to appropriately set LCD pixels at blank (black) or selected activated (non-black) status to replicate the image defined by the analog video signal.

Unfortunately, such A/D conversion is often imperfect due to errors in the pixel clock sampling of the analog signal. Such sampling imprecision gives rise to frequency (also know as "tracking") and "phase" errors, both of which may degrade the quality of the LCD image.

Referring to the analog video signal 1 and pixel clock signal 4' in FIG. 1b, tracking error results from the number n of pixel clocks being improperly set. As discussed above, the number n of pixel clocks should be equal to the number of pixel data components 2 of each horizontal line of analog video data signal. In FIG. 1b, the improper setting of n results in the pixel data components 2 not being sampled at a consistent point. For instance, n is set too large in clock signal 4' (i.e. the clock signal frequency is too high). The resulting crowding of the pixel clock pulses 5' yields an additive leftward drift of the pixel clock pulses 5' relative to the pixel data components 2 of the analog video data signal 1. Such drift causes sampling in the transition regions 3. For instance, as indicated by positional bracket A, the leading edges 7' of the third through the sixth clock pulses 5' sample in transition zones 3 of the analog video signal 1. Accordingly, the transition zone data will be erroneous and the image information from adjacent non-sampled pixel data components 2 will be missing from the digitized video signal. If n is erroneously set large enough, the pixel clock pulses may be so crowed that individual analog pixel data components 2 may be double-sampled. On the other hand, if n is set too small (i.e. the pixel clock signal frequency is too low), the dispersion of the pixel clock pulses results in a rightward drift wherein sampling may also occur in the transition regions. In all of these cases, the erroneous sampling provides erroneous video signal data that may degrade the LCD image quality.

Phase error may occur even if the pixel clock signal frequency equals the analog video data signal frequency. As shown in pixel clock signal 4" in FIG. 1c, the clock phase may be erroneously set such that every pixel clock pulse samples a transition region 3 of the analog video data signal. Leading edge jitter makes such phase error more likely, since if the jitter zones straddle the intersections 8 of the pixel data components 2 and transition regions 3 of the analog video data signal 1, the voltage will be randomly sampled on either side of the intersection 8. In any case, phase error is undesirable in generating undesirable noise, or "snow" in the LCD video image.

In order to eliminate tracking and phase errors in existing projection systems, manual controls are provided on projection systems which permit an operator to adjust the number n of clocks 5 and the phase of the pixel clock waveform. These controls are adjusted until the projected image appears satisfactory to the eye of the system operator. While such manual error control is usually effective in achieving an acceptable image quality, such manual control is time-consuming and inhibits the user-friendliness of the projection system.

Thus, in light of these disadvantages, it is a principle object of the present invention to provide an apparatus and method for producing a digital video signal from a analog video signal that automatically corrects phase and tracking errors.

It is another object of the present invention to provide such automatic phase and tracking error correction for a wide range of analog video signal resolution modes.

It is another object of the present invention to provide an apparatus and method for producing a digital video signal from a analog video signal that automatically corrects the horizontal position of a video image on the display object.

In accordance with a preferred method of the present invention, a digital video signal is produced from an analog video signal which includes an analog video data signal that is operable to be raster scanned in lines across a CRT screen to form consecutive frames of video information, the raster scanning controlled by use of a horizontal synchronizing signal ($H_{sync}$) that controls a line scan rate, and a vertical synchronizing signal ($V_{sync}$) that controls a frame refresh rate, to produce consecutive frames of video information. The digital video signal is produced by generating a pixel clock signal with pixel clocks for repetitively sampling instantaneous values of the analog video data signal, and digitizing the active image width of the analog video data signal based on the pixel clock sampling. An expected width E, measured in number of pixel clocks, of a video image producible by the analog video signal is estimated, and an actual width W, measured in number of pixel clocks, of the actual video image producible by the analog video signal is calculated. The actual width W is compared with the expected width E. When E does not equal W, at least one of a frequency component and a phase component of the pixel clock signal is adjusted until E equals W.

In accordance with another preferred method of the present invention, the phase component of the pixel clock signal may be corrected by the steps of generating a pixel clock waveform having a series of pixel clock pulses with portions operable to sample values of the analog video signal pixel components, sampling values of the pixel components with the pixel clock pulses, selecting a selected pixel component at the edge of the active video region that is horizontally stationary from frame to frame of analog video data; and automatically iteratively adjusting a pixel clock pulse phase until a pixel clock pulse is centrally registered with the selected pixel component.

In accordance to other aspects of the present invention, apparatus are provided for carrying out the above and other methods.

DETAILED DESCRIPTION OF PREFERRED EMBODIMENTS

Figure 1A:
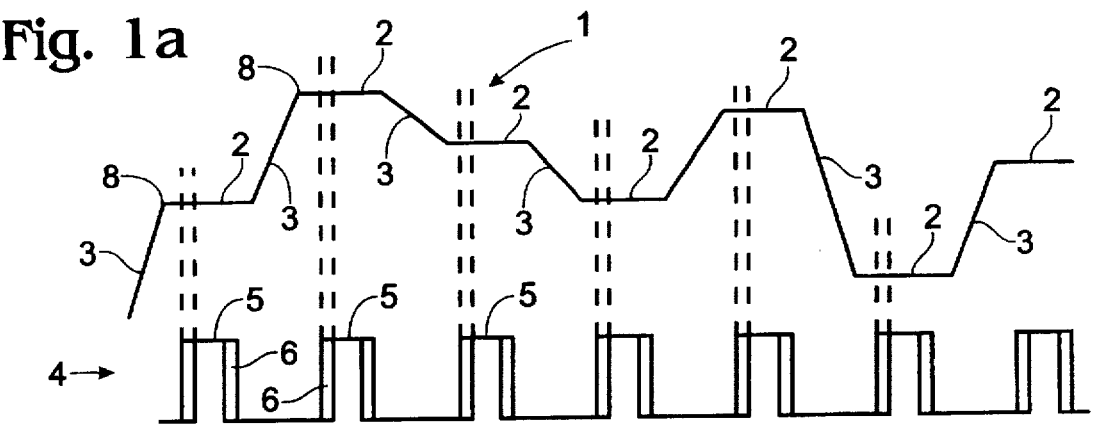
FIG. 1a depicts an analog video data signal waveform and a pixel clock signal waveform in a desired relationship where no tracking or phase error would be result.
Figure 1B:
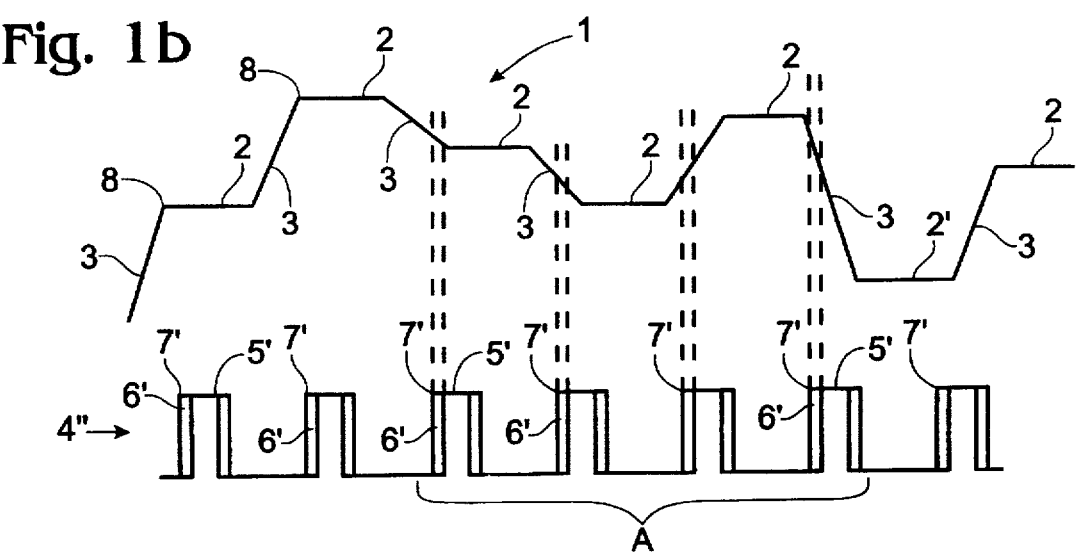
FIG. 1b depicts an analog video data signal waveform and a pixel clock signal waveform in a relationship where tracking error would result.
Figure 1C:
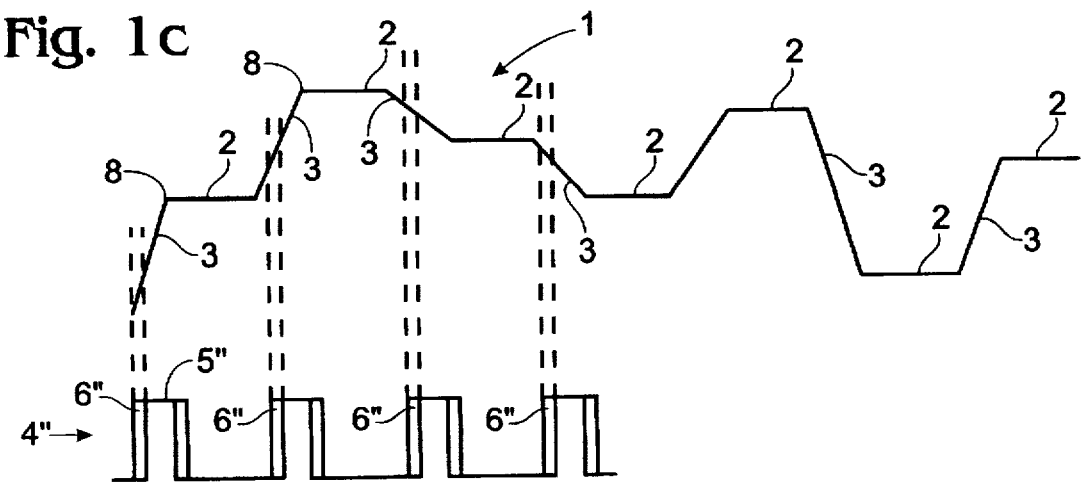
FIG. 1c depicts an analog video data signal waveform and a pixel clock signal waveform in a relationship where phase error would result.
Figure 2:
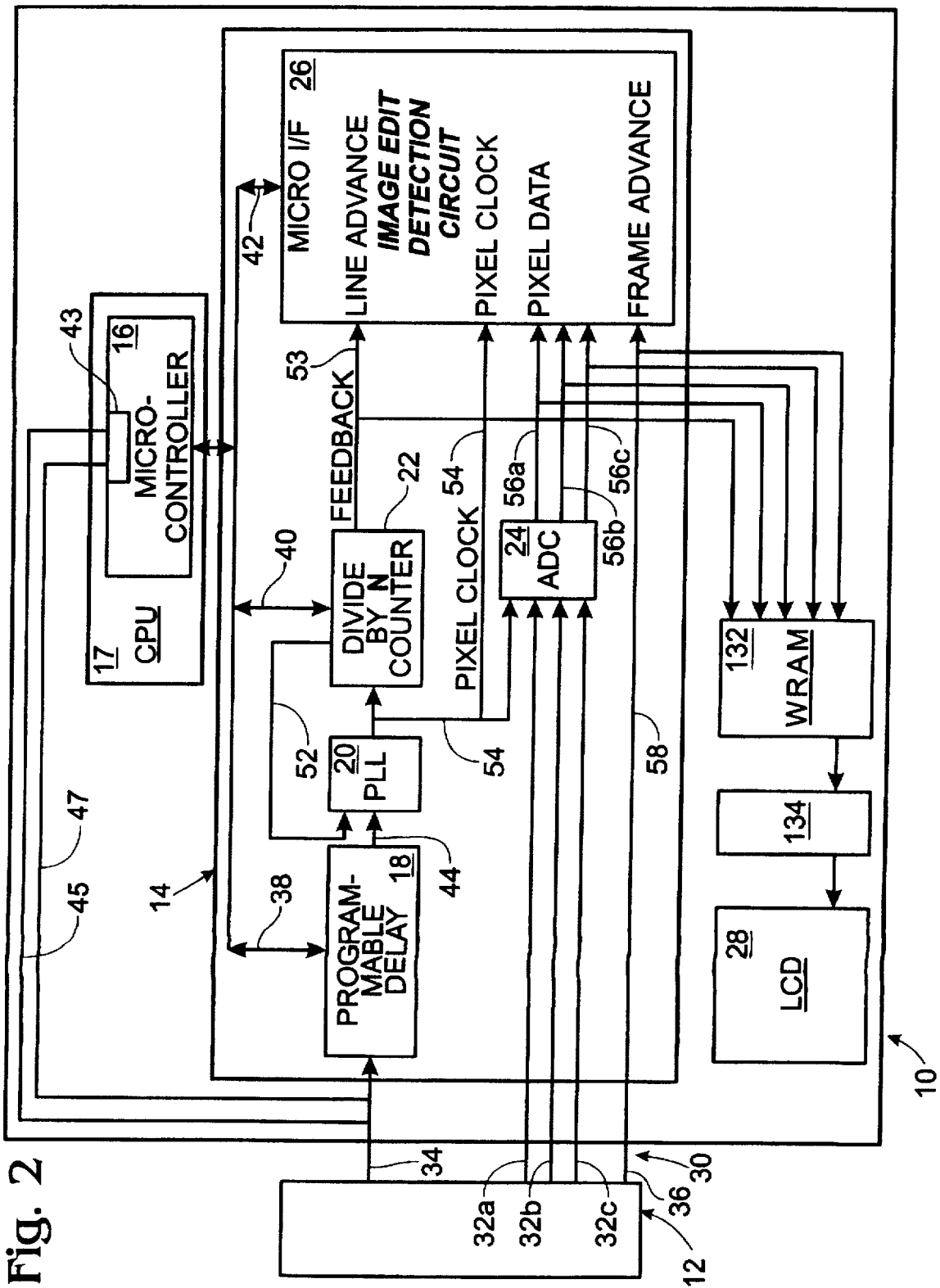
FIG. 2 is an overall schematic view of multimedia source connected to a multimedia projection display system, and depicting an analog video signal capture circuit in accordance with an aspect of the invention.

FIG. 2 schematically depicts a projection display system 10 in accordance with the present invention, connected to a multimedia source 12 of the PC type. The projection display system 10 includes an image capture circuit 14 that automatically eliminates phase and tracking error. A microcontroller 16, which is part of a display system CPU 17, controls the image capture circuit 14. The image capture circuit includes a programmable delay device 18, a PLL 20, a divide-by-n-counter (counter) 22, an A/D converter 24, and an ASIC (Application Specific Integrated Circuit) 26 that contains an image edge detection circuit. The microcontroller 16 executes a firmware program that runs the ASIC edge detection circuit 26, and controls the delay device 18 and the counter 22 based on the output of the edge detection circuit 26 to eliminate phase and tracking errors. A display object, preferably an active matrix LCD 28, is connected to the output of the A/D converter.

As shown in FIG. 2, for purposes of video signal transmission, the multimedia source PC 12 is connected to the projection display system 10 through a video source cable 30 which is shown in exploded schematic form. The cable 30 is of conventional design and includes multiple distinct conductors that are shielded together, including three separate channels 32a, 32b, 32c for carrying analog signals corresponding to red, green, and blue (RGB) color video components, and two conductors 34, 36 carrying the $H_{sync}$ and $V_{sync}$ signals, respectively.

Turning to the details of the image capture circuit 14, the microcontroller 16 is connected to the delay device 18 by a bus 38, to the counter 22 by a bus 40, and to the ASIC 26 by a bus 42. A mode identification counter 43, which is connected to $H_{sync}$ and $V_{sync}$ through conductors 45 and 47, respectively, may be located in the microcontroller or the ASIC. The mode identification counter 43 may also be provided independent of the microcontroller. A preferred microcontroller 16 is model MC6833 1, made by Motorola.

The delay device has an input connected to the $H_{sync}$ conductor 34, and an output connected to the PLL through conductor 44. The preferred delay device is model No. DS10205-25, made by the Dallas Corporation.

Figure 3:
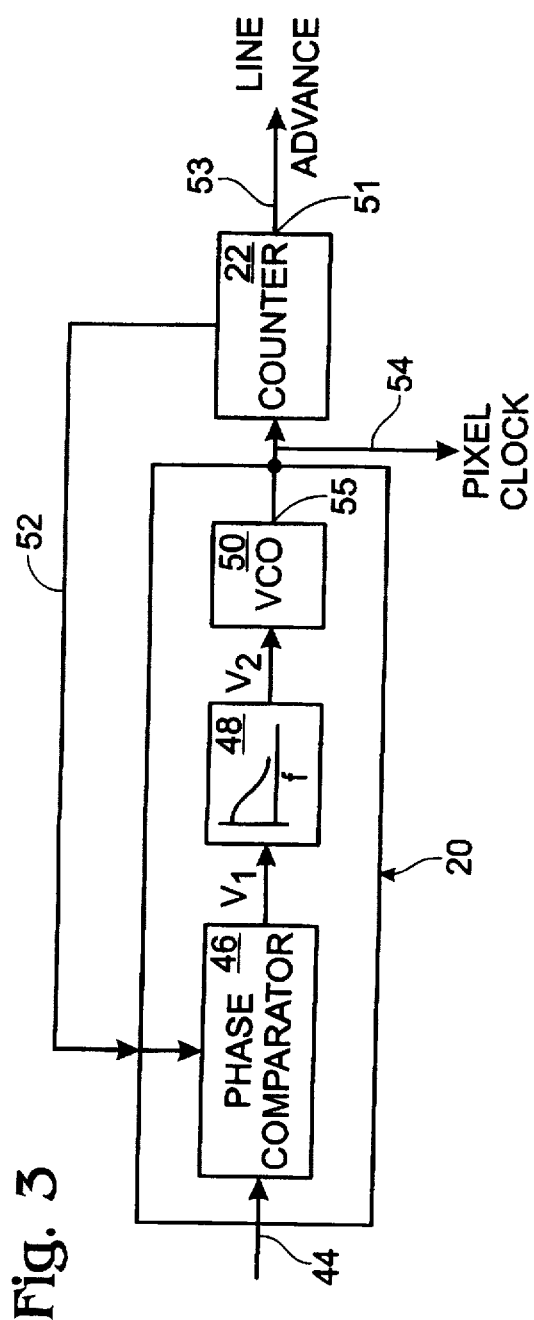
FIG. 3 is a schematic view of a phase-locked-loop (PLL) circuit used in analog video signal capture according to an aspect of the present invention.

As shown in detail in FIG. 3, the PLL 20 is of conventional design and includes a phase comparator 46, a low-pass filter 48, and a VCO pixel clock signal generator 50. A feedback loop 52 provided with the counter 22 connects the VCO output 55 and the phase comparator 46. The counter output 51 is connected to the ASIC 26 through a conductor 53, and the VCO output 55 is connected to the ASIC 26 and the A/D converter 24 through conductor 54. The preferred PLL is model ICS 1522 made by ICS. The counter is preferably a part of the ASIC.

Figure 4:
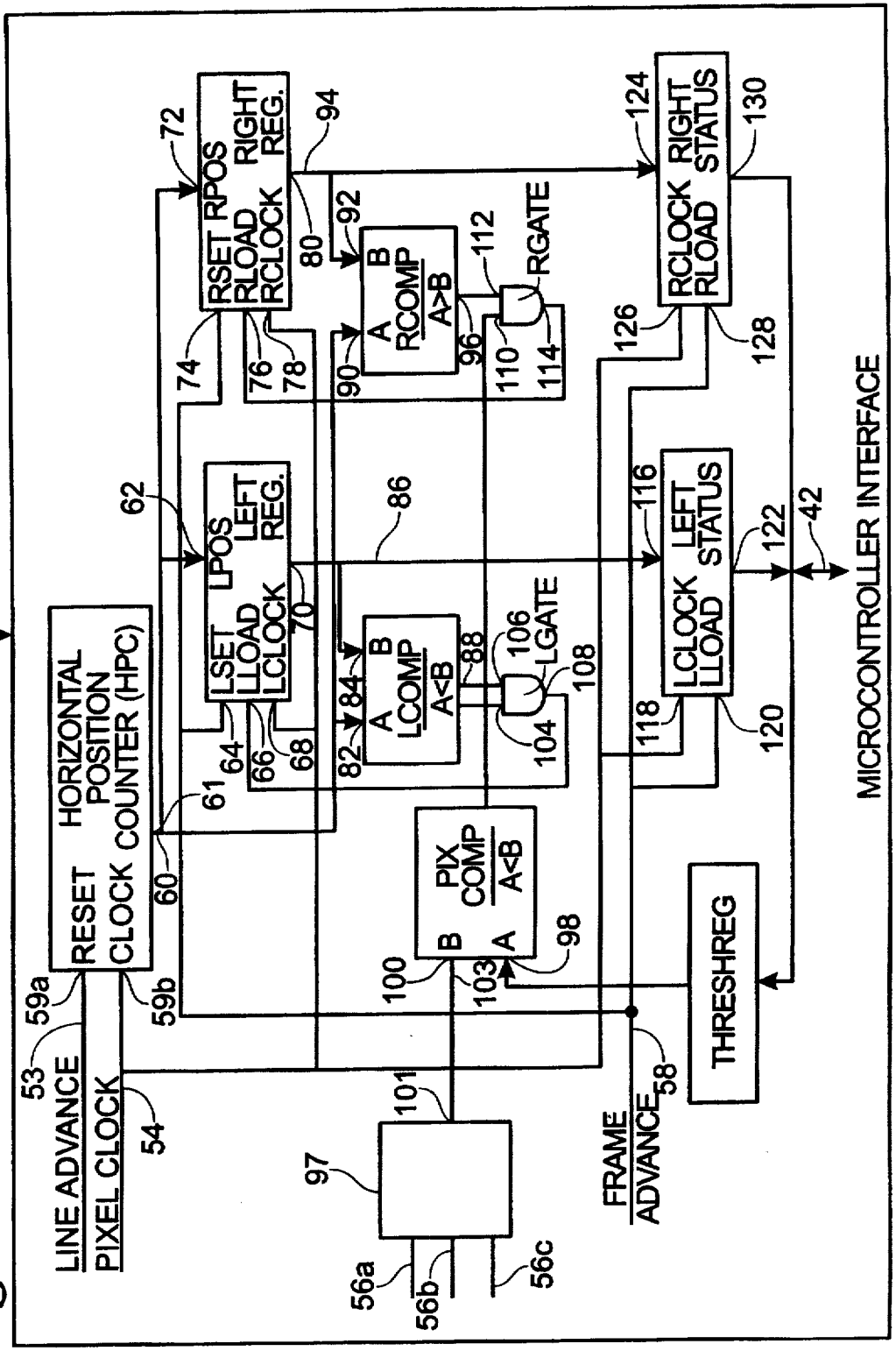
FIG. 4 is an detailed schematic view of an image edge detection circuit portion of the video image capture circuit shown in FIG. 2.

Referring to FIGS. 2 and 4, the three analog video data signal channels 32a, 32b, 32c are connected to the A/D converter input. The A/D converter 24 includes three separate conventional A/D converters for digitizing each of the red, green and blue analog video data signals. Three color data signal channels 56a, 56b, 56c connect the A/D converter output to the ASIC. A preferred A/D converter is model 9542A made by the Raytheon Corporation.

The $V_{sync}$ signal output of the PC source 12 is connected to the ASIC 26 through a frame advance conductor 58.

The ASIC image edge detection circuit 26 is shown in detail in FIG. 4. In a preferred mode, VHSIC Hardware Descriptive Language (VHDL) is used to linguistically represent the preferred circuit logic. The VHDL code is then used to synthesize the gate array logic in the ASIC.

The edge detection circuit 26 has a microcontroller interface connected to the microcontroller bus 42, and inputs connected to the line advance signal conductor 53, pixel clock signal conductor 54, color data signal channels 56a, 56b, 56c, and the frame advance conductor 58. The edge detection circuit includes a horizontal position counter (HPC) with a RESET input 59a that receives the line advance conductor 53, and a CLOCK input 59b that receives the pixel clock conductor 54. The HPC further has an HPC output 61 connected through a HPC bus 60 to a left edge register (LEFT REG), a left edge comparator (LCOMP) associated with the LEFT REG, a right edge register (RIGHT REG), and a right edge comparator (RCOMP) associated with RIGHT REG.

The LEFT REG has a LPOS input 62 connected to the HPC output 61, an LSET input 64 connected to the $V_{sync}$ signal conductor 58, a LLOAD input 66 discussed below, a LCLOCK input 68 that is connected to the pixel clock signal conductor, and an LEFT REG output 70. The RIGHT REG has a RPOS input 72 that is connected to the HPC output 61 through bus 60, a RRESET input 74 that receives the $V_{sync}$ frame advance signal, an RLOAD input 76 discussed below, an RCLOCK input 78 that is connected to the pixel clock signal conductor, and a RIGHT REG output 80.

The LCOMP has a LHPC input 82 that is connected through bus 60 to the HPC output 61, an LREG input 84 that is connected through a bus 86 to the LEFT REG output 70, and an LCOMP output 88. The RCOMP has a RHPC input 90 that is connected through bus 60 to the HPC output 61, an RREG input 92 that is connected through a bus 94 to the IRIGHT output 80, and a RCOMP output 96.

Figure 5:
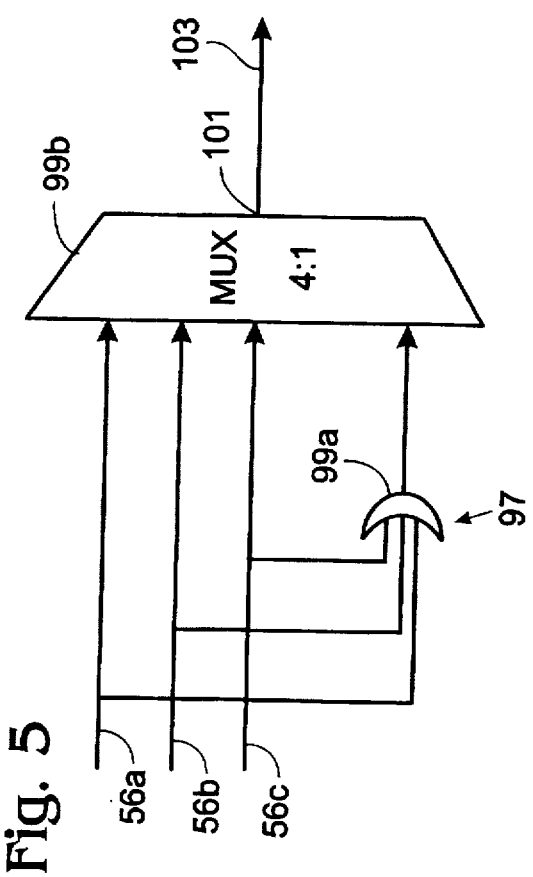
FIG. 5 schematically depicts a pixel value calculator according to one aspect of the present invention.

As shown in FIGS. 4 and 5, a pixel value calculator 97 has inputs receiving each of the RGB video data signal channels 56a, 56b, 56c. The RGB video data signals are connected in parallel to an "OR" gate 99a, and are connected to a 4:1 multiplexer 99b. The output of the OR gate 99a is also connected to the multiplexer 99b. The output 101 of the pixel value calculator is connected through bus 103 to a pixel component value comparator (PIXCOMP).

The PIXCOMP has a threshold value input 98 connected to a threshold value register (THRESH REG), and a pixel value input 100 connected to the pixel value calculator 97. The PIXCOMP has an output 102 connected to a first input 104 of a left AND gate (LGATE). The LGATE has a second input 106 that is connected to the LCOMP output 88, and a LGATE output 108 that is connected to the LLOAD input 66 of the LEFT REG. The PIXCOMP output is also connected to a first input 110 of a right "AND" gate (RGATE). The RGATE has a second input 112 that is connected to the RCOMP output 96, and an output 114 that is connected to the RLOAD input 76 of the RIGHT REG.

A left edge status register (LEFT STATUS) has an input 116 connected through bus 86 to the LEFT REG output 70, a LCLOCK input 118 connected to the pixel clock signal, a LLOAD input 120 connected to the $V_{sync}$ frame advance signal, and an output 122 connected through bus 42 to the microcontroller (FIG. 2). A right edge status register (RIGHT STATUS) has an input 124 connected through bus 94 to the RIGHT REG output 80, a RCLOCK input 126 connected to the pixel clock signal, a RLOAD input 128 connected to the $V_{sync}$ frame advance signal, and an output 130 connected through bus 42 to the microcontroller (FIG. 2).

Turning to the signal path to the LCD shown in FIG. 2, the line advance conductor 53, the digital video data signal channels 56a, 56b, 56c, and the frame advance conductor 58 are connected to an input port of a window random access memory (WRAM) 132. The WRAM has an output port connected to an LCD control module 134. The LCD control module is connected to the LCD 28. The LCD is preferable a 6.4 inch active matrix LCD, such as model LQ64P311 made by Sharp.

Operation

The operation of the preferred embodiment will now be explained. The display system 10 determines the resolution mode by a firmware program that uses the mode identification counter 43. $H_{sync}$ is input through conductor 45 to the mode identification counter 43, and the number of 50 MHz counter clocks over twenty $H_{sync}$ pulses is counted. In this way, an average number of clocks per line is obtained. $V_{sync}$ is input through conductor 47 into the mode identification counter 43, and the number of lines for each $V_{sync}$ pulse is obtained. The firmware then accesses a look-up table that determines resolution based on the number of 50 MHz clocks per twenty lines, and number of lines per frame. An exemplary look-up table showing a few common non-interlaced 60 Hz video modes is as follows:

TABLE 1

| $V_{sync}$ (Hz.) | Number of 50 MHz Clocks/20 lines | Lines/Frame | Resolution | Pixel Clocks/ Line (n) |
|---|---|---|---|---|
| 60 Hz | 31778 | 525 | 640 × 480 | 800 |
| 60 Hz | 24400 | 628 | 800 × 600 | 1056 |
| 60 Hz | 20677 | 806 | 1024 × 768 | 1344 |
| 60 Hz | 15631 | 1066 | 1280 × 1024 | 1696 |

Thus, for exemplary values of 31778 50 MHz clocks in twenty lines, and 525 lines per frame, the look-up table determines a resolution of 640×480, with a number n of pixel clocks per line of 800. The expected width (in pixels) of the active video region 11 (see FIG. 1d) is initially set at the horizontal component of the resolution (e.g. 640).

It is to be understood that such number n is an initial guess, and that a range of initial n values will work, due to the iterative corrective nature of the present invention. Accordingly, n may be determined in other ways, such as by multiplying the horizontal resolution by a constant slightly larger than 1.0. It is also to be understood that the preferred look-up table will cover modes from 640×480 to 1600×1200 resolution, and from 60 Hz to 100 Hz frame refresh rates. Moreover, other ways of determining the resolution are possible, such as by using the number of lines per frame to determine the vertical and horizontal resolution.

Digitization of the analog video data signals occurs based on the n pixel clocks per line. Referring to FIG. 3, the PLL 20, the VCO 50 generates the pixel clock signal, and the microcontroller 16 sets the counter 22 to generate a feedback pulse (i.e. line advance signal) once every n pixel clocks. Once n is selected, the PLL automatically adjusts to produce a line advance signal frequency corresponding to $H_{sync}$, and a pixel clock signal having a frequency of n times the line advance frequency.

The PLL works by the phase comparator 46 receiving the $H_{sync}$ signal from the delay device 18 through conductor 44, and receiving the feedback pulse signal through the feedback loop 52. The phase comparator 46 compares the frequencies of the $H_{sync}$ and the feedback pulse signal, generating an output voltage that is a measure of their phase difference. If the feedback pulse frequency does not equal the $H_{sync}$ frequency, the phase difference signal causes the VCO pixel clock frequency to deviate so that the feedback pulse frequency of the counter 22 deviates toward the $H_{sync}$ frequency.

Referring again to FIG. 2, the feedback pulse signal (line advance signal) of the counter 22 is directed to the ASIC 26 through a conductor 53, and the pixel clock signal of the VCO 50 is directed to the ASIC 26 and the A/D converter 24 through conductor 54. The line advance signal and $V_{sync}$ are conditioned to be one clock pulse in duration, through the use of a pulse edge detection circuit or the like.

The A/D converter 24 samples (reads) the instantaneous voltage value of the analog video data signal at the leading edge of each of the pixel clocks, thereby generating a series of sampled data signal values. The A/D converter then quantizes the sampled values by matching each value to one of a series of preselected voltage amplitude levels, which have corresponding numerical values. These numerical values are then represented digitally and coded to establish 8-bit data for each of the colors red, green and blue. The three eight-bit color data signals are input through the three respective color data signal channels 56a, 56b, 56c to the edge detection circuit 26. At the LCD, the coded color data signal set pixels at blank (black) or specific activated (non-black) status corresponding to the sampled voltage level.

The actual width W of the active video region 11 (FIG. 1d) is then determined by the image edge detection circuit shown in FIG. 4. The actual width W is measured in number of pixel clocks equal to: ((the right-most active pixel in a frame)−(the left most-active pixel in a frame)+1). Thus, W is a measure of the total number of pixels across the active video region of a frame of video data. The pixel clock positions referred to in the following are the sampling positions of pixel clocks along the lines of analog video data in a frame.

Referring to FIG. 5, the PIXCOMP compares the threshold value with the value of each pixel of the pixel data signal, and generates a binary "yes" if the pixel value is greater than the threshold value. The pixel value calculator 97 determines the value of each pixel by grouping the twenty-four total bits of each pixel together in eight groups of individual red, green and blue bits. Each of these groups of three bits is passed through the "OR" gate 99a, and the results of all of the eight "ored" groups and the digital RGB data signals are multiplexed in the 4:1 multiplexer 99b to establish a value for each pixel. It is contemplated that the pixel value may be set in various other ways, including setting a separate value for one or each of the RGB digital data signals.

The pixel value is compared against a selected threshold value at the PIXCOMP. Referring again to FIG. 4, if the sum is greater than the threshold value, a binary "yes" signal is delivered to the LGATE and RGATE, designating the pixel as active. If the pixel value sum is less than the threshold value, the PIXCOMP generates a binary "no", indicating the pixel as inactive.

The HPC consecutively numbers the pixel clock pulses that sample each line of analog data pixel components, thereby establishing the horizontal position of the pixel components. The LCOMP compares the instantaneous pixel position generated by the HPC with a pixel position stored in the LEFT REG. At the beginning of each frame, the LEFT REG is preferably initialed at the far right pixel position of the video region (i.e., the right edge of the inactive margin region 13 in FIG. 1d). The LCOMP outputs a binary "yes" to the LGATE when the instantaneous HPC pixel position is less than the pixel position stored in the LEFT REG. When the PIXCOMP is simultaneously outputting a "yes", the LGATE signals the LEFT REG through the LLOAD input 120 to replace the stored LEFT REG pixel position with the instantaneous HPC pixel position.

Similarly, the RCOMP compares the instantaneous pixel position generated by the HPC with a pixel position stored in the RIGHT REG. At the beginning of each frame, the RIGHT REG is preferably initialed at the far left pixel position of a video region (i.e., the left edge of the inactive margin region 13 in FIG. 1d). Referring again to FIG. 4, the RCOMP outputs a binary "yes" to the RGATE when the instantaneous HPC pixel position is greater than the pixel position stored in the RIGHT REG. When the PIXCOMP is simultaneously outputting a "yes", the RGATE signals the RIGHT REG through the RLOAD input to update the stored RIGHT REG pixel position with the instantaneous HPC pixel position.

At the end of each frame, $V_{sync}$ signals the LEFT STATUS and RIGHT STATUS to update the respective stored left edge and right edge pixel positions. The stored left and right pixel positions are then read by the microcontroller, and the actual width W (in pixels) of the active video region 11 of the frame 9 (FIG 1d) is calculated by subtracting the left edge pixel position stored in LEFT STATUS from the right edge pixel position stored in RIGHT STATUS.

Once the actual width W is determined, the microcontroller compares it with the expected width E. If E=W, then the clock phase and the number n of clocks per line is correct. In other words, at E=W, each discreet data region (plateau) of the analog video data signal is aligned with and sampled by a pixel clock, resulting in error-free digitization of the analog video data signal. In this case, n and the pixel clock phase are left unchanged for the scanning of the next frame.

If W>E+1 or W<E, then the number n of clocks per line is incorrectly set, resulting in tracking error. To correct such tracking error, a the number n of pixel clocks is adjusted to a new number n'=n •(E/W). The original n is replaced by the adjusted n', and the next frame is scanned as set forth above. Such adjustment of n is iteratively repeated every frame until W=E or W=E+1. Put another way, if the actual width W is larger than the expected width E, the number of pixel clocks n per line is decreased, (i.e. the period of each pixel clock is increased, and the frequency of the pixel clock signal is decreased), so that the width of the E pixel clocks is effectively spread out to precisely register with the active pixel data region. Conversely, if the actual width W is smaller than the expected width E, the number of pixel clocks n per line is increased, so that the width of the E pixel clocks is effectively contracted to register precisely with the active pixel data region of the analog video data signal.

Once the tracking error is corrected, any phase error is corrected. As discussed above, if W=E, the number of pixel clocks n per line is correctly configured, and no phase error exists. However, if W=E+1, phase error is present, resulting in noise in the video display. Referring to FIG. 1, phase error occurs because of the "jitter" zones present in the leading and trailing edges of clock pulses. Even if the pixel clock signal frequency is equal to the analog video data signal frequency, phase error noise will occur if the jitter zone on the leading edge of the pixel clock waveform overlaps with a transition zone on either side of plateau regions of the analog video data waveform.

To correct the phase error when W=E+1, the microcontroller signals the programmable delay to adjust the pixel clock signal phase by a selected iterative amount for each of a series of subsequent frames. The pixel clock phase iteration proceeds until the frame phase error condition passes from W=E+1 through a subseries of frames without phase error (i.e. W=E), and back to a frame with a phase error condition of W=E+1. The resulting series of W values is stored in memory provided in the microcontroller. The stored series of W values are then examined to identify the subseries of consecutive frames in which W=E. A corrected phase setting associated with a frame at the center of the subseries is then selected, and the programmable delay is signaled to set the pixel clock phase at the corrected phase setting. Thus, the phase is set so that the pixel clock leading edges are located in the middle of the analog video signal pixel components, in order to consistently avoid sampling in transition regions.

The pixel clock phase may alternatively be corrected independent of calculation of W. Under this embodiment, a pixel component at the edge of the active video region that is horizontally stationary from frame to frame of analog video data is identified, and the pixel clock pulse phase is automatically and iteratively adjusted until the jitter zone of a pixel clock pulse is centrally registered on the selected pixel component.

Figure 1D:
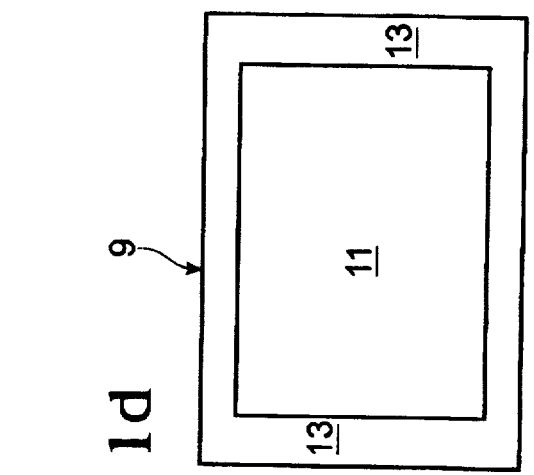
FIG. 1d depicts an exemplary video display, showing a central active video region surrounded by an inactive margin region.
Figure 7:
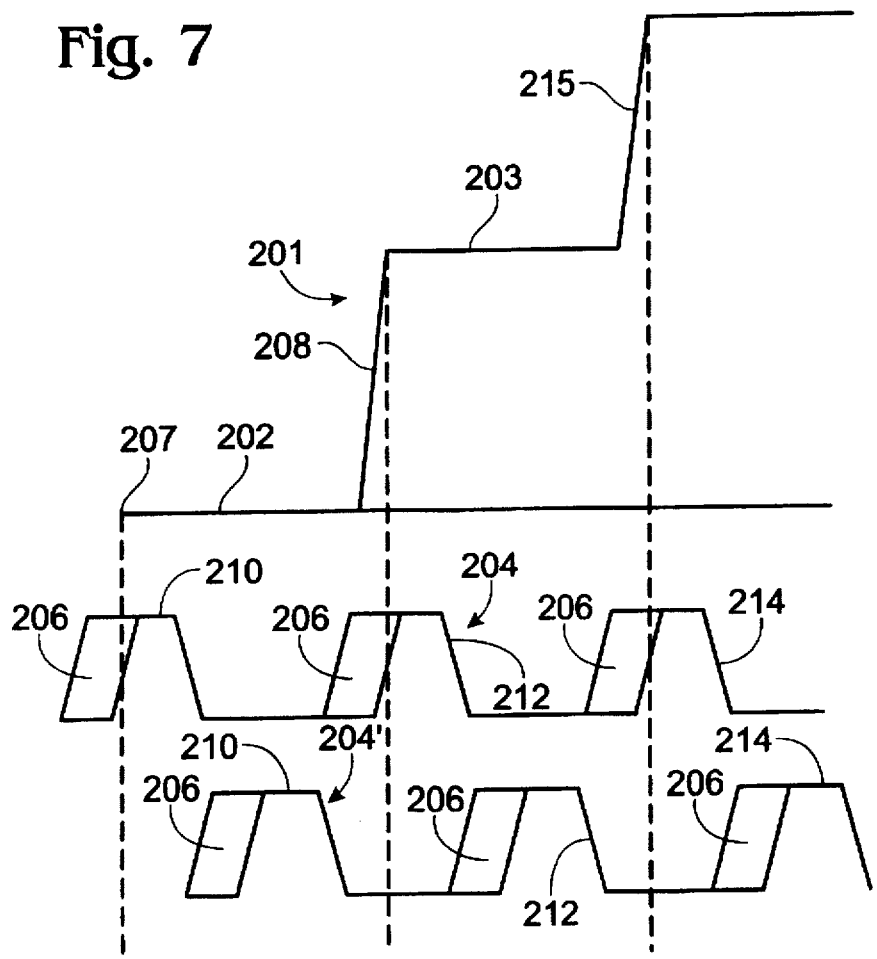
FIG. 7 depicts an analog video data signal waveform and a pair of pixel clock signal waveforms in one embodiment of phase error correction according to the present invention.

One preferred example of this embodiment is illustrated in FIGS. 1d and 7, wherein the left-hand edge of the active video region 11 (i.e. left-hand-most active pixel component) is selected, and the pixel clock phase position is adjusted to center the pixel clock leading edges 207 on the analog video signal pixel components. To illustrate this phase correction technique, FIG. 7 shows a simplified embodiment wherein a row of analog pixel data 201 has a blanked pixel 202 to the left of a left-most (i.e. first) active pixel 203, and second active pixel 204. Pixel clock waveform 205 represents a pixel clock that would result in phase error. Pixel clock waveform 205' represents the pixel clock in a phase-corrected state.

The pixel clock waveform 205 produces phase error because it has jitter zones 206 that straddle the transition zones 208, 215 between the pixel components 202 and 203, and 203 and 204, respectively. Thus, the second pixel clock 212 straddling the transition zone 208 of the first active pixel may randomly sample across the blanked pixel 202, the transition zone 208, and the first active pixel 203 from frame to frame of video data. Likewise, the third pixel clock 214 straddling the transition zone 215 between the first active pixel 203 and a second active pixel 207 may randomly sample across the first active pixel 203, transition zone 215 and second active pixel 204 from frame to frame. This random sampling from frame to frame may create undesirable "snow" in the projected video image.

In the example of FIG. 7, this phase error results in the HPC randomly locating the first active pixel 203 at either horizontal line position N=2 or N=3. As discussed above, N represents the number of pixel clocks from the feedback pulse. Thus, the first active pixel 203 is registered as N=2 if pixel clock 212 samples active pixel 203, or N=3 if pixel clock 212 samples blanked pixel 202 and pixel clock 214 samples active pixel 203.

To correct such phase error, the first active pixel 203 at the left edge of the central active video data region is selected. Then the programmable delay 18 (FIG. 2) adjusts the pixel clock signal phase by a selected iterative amount for each of a series of subsequent frames to locate a phase setting wherein the pixel clock pulse 212' is centered on the first activated pixel component 203 (FIG. 7). For ease of description, it will be assumed that sampling always occurs at the left-most leading edges 207 of the pixel clock jitter zones 206, 206'. Referring to waveform 205 in FIG. 7, the left-most active pixel component is initially indicated at N=3 (i.e. the leading edge 207 of pixel clock 214 is the first to sample on an active pixel component). The pixel clock phase iteration then proceeds rightward through a series of frames where the N shifts by one integer. Waveform 205' is one of this series of frames, wherein the left-most active pixel is indicated at horizontal line position N=2. In this condition, the pixel clock leading edges 207 are moved away from pixel transition zones 208, 215, so that no phase error is produced. Thus, no matter what the state of the jitter, the left-most active pixel is always registered at horizontal line position N=2.

The iterative phase adjustment continues to move the pixel clock waveform rightward relative to the analog pixel data waveform until the registration shifts back to N=3. The resulting series of N values is stored in the microcontroller memory. The stored series of N values are then examined by the microcontroller to identify the subseries of consecutive frames in which N=2. A corrected phase setting associated with a frame at the center of the subseries is then selected, and the programmable delay is signaled to set the pixel clock phase at the corrected phase setting. Thus, the phase delay is set so that the pixel clock jitter zones 206'are located in the middle of the analog video signal pixel components 203, 204, away from the transition zones between the pixel data components.

It is further contemplated that this type of phase error correction may be carried out based on the right-hand-most active pixel component, or indeed with any of a variety of selected pixel components. In all of these cases, the pixel clock phase is iteratively adjusted until the selected number generated by the HPC associated with the pixel clock pulse that samples the selected pixel component shifts by one integer and then shifts back to the selected number. The phase condition of the frame at the center of the subseries of frames associated with the shifted number is then chosen as the correct phase. It is also contemplated that the iterative phase adjustment may proceed in the opposite direction (i.e. leftward in FIG. 7), or that jitter zones on the trailing edges of the pixel clock pulses may sample the pixel components. In this case, the trailing edge jitter zones would be iteratively centered on the pixel components. Furthermore, this phase correction technique works well when the pixel clock waveform does not have jitter zones, since the pixel clock leading edges are positioned away from the transition zones.

Under any of the above methods of phase error correction, the digital video signals output from the video capture circuit 14 are manipulated by the WRAM 132 and LCD control module 134 to appropriately control the LCD 28. For instance, the WRAM and LCD control module may "flip" the digital video signals as appropriate for different multimedia display system 10 applications, such as front lighting and back lighting of a display screen. The WRAM and LCD control module may also serve to manipulate interlaced video modes into non-interlaced form appropriate for controlling the LCD.

It is also noteworthy that the method and apparatus of the present invention can be used to properly horizontally position the active video region 11 (FIG. 1d) on the LCD. In this application, the value of LEFT STATUS may be used to determine when video data begins to be stored by the WRAM 132. Thus, no data is stored for the blanked margins on either side of the active video region, eliminating the possible that spuriously activated analog pixel components in the blanked margin region will be transferred to the LCD.

EXAMPLE

An exemplary tracking error correction method based on image edge detection will now be described in conjunction with the exemplary screen image shown in FIG. 6a. The flow chart shown in FIG. 6b further illustrates the tracking error correction method.

The determination of the actual image width E for a single frame will be described, with the assumption that that the original analog image has a resolution of 640×480. As indicted in box 162 of FIG. 6b, the look-up table is utilized to select the number of lines/frame=525, and n=800. In this example, the pixel position will be designated by Cartesian coordinates corresponding to the horizontal line position and vertical line of the pixel.

The exemplary screen image 140 is a diamond-shape 142 above a horizontal menu bar 144. A margin of blanked pixels 146 (bounded by a dashed line) extends along the sides and the top and bottom of the active image region 148. The diamond has an upper point at horizontal pixel position 400, 20. The diamond widens to a pair of side points on the same horizontal pixel line at respective pixel positions 200, 300 and 600, 300. The diamond has a lower point at horizontal pixel position 400, 475. The menu bar immediately below the diamond has upper left and right edges at horizontal pixel positions 80, 475 and 720, 475 respectively.

Prior to imaging, as shown in flow chart box 164, the LEFT REG is initialized at 800 (i.e. n) and the RIGHT REG is initialized at 0. The frame scan occurs with $H_{sync}$ pulses initiating consecutive lines of analog video data. The top of the frame has lines of blanked pixel data that advance line by line down through the blanked upper margin of the total data region. No activated pixel components are detected since none of the blanked pixel values P are above the threshold value T. Thus, the conditions of boxes 166a and 166b (HPC<LEFT REG, HPC>RIGHT REG) are not met in any of the blanked upper margin lines, and the LEFT REG and RIGHT REG (as indicated in boxes 168a and 168b) are thus not updated.

Figure 6A:
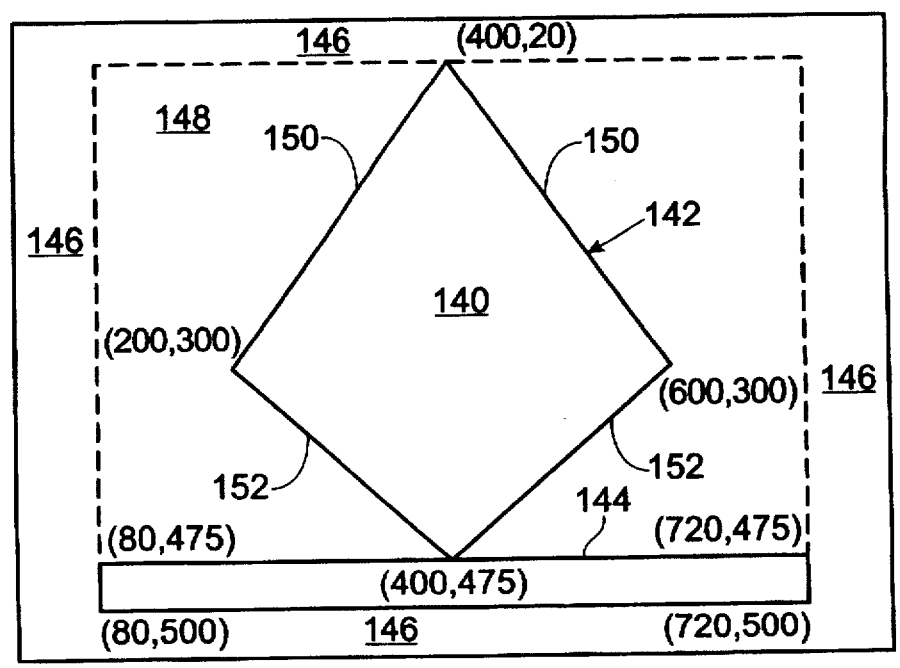
FIG. 6a depicts an exemplary configuration of video data on a display object in accordance with the present invention.

Referring to FIG. 6a, the first active pixel is sampled at the diamond upper point at 400, 20. At this point the HPC<LEFT REG and the HPC>RIGHT REG, so that both LEFT REG and RIGHT REG update to 400. The LEFT REG updates toward the left and the RIGHT REG updates toward the right as the frame scan moves downward through upper diagonal section 150 of the diamond. The LEFT REG and RIGHT REG are respectively updated to 200 and 300 at the diamond side corners, and then are not further updated as the frame scan moves through narrowing lower diagonal section 152 of the diamond.

As the frame scan moves onto the menu bar area, active pixel data begins at HPC=80. Since HPC=80<LEFT REG =200, the LEFT REG updates to 80. As the scan moves past HPC=600 toward the right edge of the menu bar, the RIGHT REG updates rightward until RIGHT REG=720 at the right edge of the menu bar. The LEFT REG and RIGHT REG do not further update as the frame scan moves down through the menu bar and the lower blanked area.

Figure 6B:
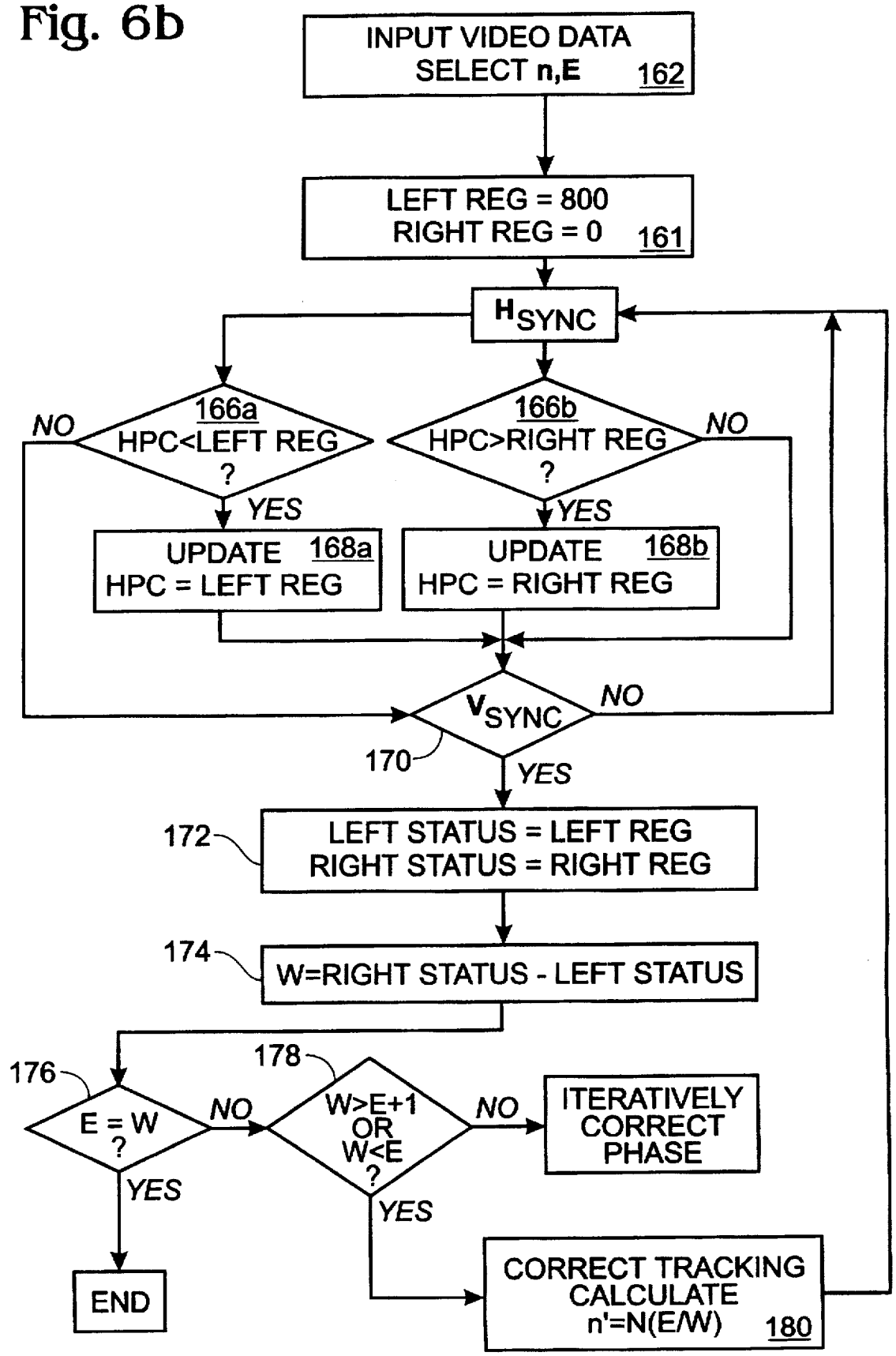
FIG. 6b is a flow chart showing a tracking correction method according to the present invention.

Referring to boxes 170, 172 and 174 of FIG. 6b, at the end of the frame, $V_{sync}$ signals the LEFT STATUS and RIGHT STATUS to update the left and right edge positions respectively to 80 and 720. The microcontroller then calculates W=RIGHT STATUS−LEFT STATUS=640.

The status of tracking error is then checked, as indicated in boxes 176, 178 and 180 of FIG. 6b. In this example, W=E=640, and no tracking or phase error correction is required. Of course, if W>E+1 or W<E, an adjusted number n' of pixel clocks would be calculated as described above. If W=E+1, then pixel clock phase correction as first described above would be initiated. The phase correction method as described with reference to FIG. 7 may be utilized with or without regard to the condition of W.

Although the present invention has been described in connection with a preferred embodiment thereof, it is to be understood that such preferred embodiment is exemplary only. It will be appreciated by those skilled in the art that additions, deletions, modifications and substitutions may be made to the described preferred embodiment without departing from the spirit and scope of the invention. For instance, the present invention is applicable to any digital display device that converts analog video signals into digital video signals for controlling a digital display object. Such a digital display object, in addition to various types of LCD, may be a light valve of diffraction grating, micro-mirror, or other type. The analog video source may also be a VCR, a computer workstation, or other device. Moreover, the edge detection circuit can also be utilized to detect the upper and lower vertical edges of an image. Accordingly, the present invention should be interpreted broadly in reference to the appended claims.

What is claimed is:

1. A method for recovering at least one of a correct phase and frequency clock for an analog video signal that is converted for display on a digital display object having pixels arranged in lines and columns, the analog video signal including an analog video data signal with pixel components being generated at a pixel component frequency, the analog video data signal being generated to produce frames of analog video data, each frame being made up of a plurality of lines of pixel components, with each line having a central active video region made up of activated pixel components, the central active video region having edges surrounded by inactive blanked regions made up of inactive pixel components, the method comprising the steps of:

generating a pixel clock waveform having a series of pixel clock pulses, the pixel clock pulses having portions operable to sample values of the analog video signal;

sampling values of the analog video signal pixel components with the pixel clock pulses;

selecting a pixel component adjacent the edge of the central active video region that is horizontally stationary from frame to frame of analog video data; and automatically iteratively adjusting a phase of the pixel clock pulses until a pixel clock pulse is centrally registered with the selected pixel component.

2. A method for recovering a correct phase clock for an analog video signal that is converted for display on a digital display object having pixels arranged in lines and columns, the analog video signal including an analog video data signal with pixel components being generated at a pixel component frequency, the analog video data signal being generated to produce frames of analog video data, each frame being made up of a plurality of lines of pixel components, with each line having a central active video region made up of activated pixel components and inactive blanked regions made up of inactive pixel components on either side of the central active region, the method comprising the steps of:

generating a pixel clock waveform having a series of pixel clock pulses, the pixel clock pulses having a clock frequency that is equal to the pixel component frequency of the analog video signal;

sampling values of the analog video signal with the pixel clock pulses;

designating the pixel clock pulses that sample each line of analog video data with consecutive numbers;

identifying a selected number of the consecutive numbers that is associated with a pixel clock pulse that samples a selected pixel component in the frames of analog video data, wherein the selected pixel component is horizontally stationary from frame to frame of analog video data;

iteratively adjusting a pixel clock pulse phase for each of a series of frames until the selected number associated with the selected pixel component shifts by one integer to a shifted number, and further until the shifted number associated with the selected pixel component shifts back to the selected number;

identifying a subseries of frames within the series of frames, wherein each of the subseries of frames is associated with the shifted number;

identifying a corrected phase setting associated with a frame at the center of the subseries of frames associated with the shifted number; and setting the pixel clock pulse phase component to the corrected phase setting.

3. The method of claim 2, wherein the selected pixel component is positioned in the active video region immediately adjacent one of the inactive blanked regions.

4. The method of claim 2, wherein the selected pixel component is a left-hand-most active pixel component.

5. The method of claim 2, wherein the shifted number is one integer different than the selected number.

6. The method of claim 2, wherein the selected pixel component is selected by the steps of:

selecting a threshold pixel value;

calculating values for the pixel components; and comparing the values with the threshold pixel value.

7. The method of claim 6, wherein the selected pixel component has a value that is greater than the threshold pixel value.

8. The method of claim 6, wherein a first pixel component that is sampled in a frame of analog video data that has a calculated value greater than the threshold value is selected as the selected pixel component.

9. The method of claim 2, wherein the clock frequency is set equal to the pixel component frequency by the steps of:

estimating an expected width E, measured in number of pixel clock pulses, of an expected video image producible by the analog video signal;

calculating an actual width W, measured in number of pixel clock pulses, of an actual video image producible by the analog video signal;

comparing the actual width W with the expected width E; and automatically adjusting the clock frequency whenever one of W>E+1 and W<E.

10. The method of claim 9, wherein the clock frequency is decreased whenever E<W−1.

11. The method of claim 9, wherein the clock frequency is increased whenever E>W.

12. The method of claim 8, wherein the clock frequency is adjustable by adjusting a number n of pixel clock pulses across each line in a frame of video data.

13. A system for recovering a correct phase clock for an analog video signal that is converted for display on a digital display object having pixels arranged in lines and columns, the analog video signal including an analog video data signal with pixel components being generated at a pixel component frequency, the analog video data signal being generated to produce frames of analog video data, each frame being made up of a plurality of lines of pixel components having a central active video region defined by edges that are surrounded by regions made up of inactive pixel components, the system comprising:

a pixel clock signal generator for generating pixel clock pulses, the pixel clock pulses having portions that sample values of the analog video signal pixel components;

a pixel component selection means for identifying a selected pixel component adjacent the edge of the central active video region that has a constant horizontal position from frame to frame;

a programmable delay device operable to automatically and iteratively adjust a phase of the pixel clock pulses until a pixel clock pulse portion is centrally registered with the selected pixel component.

14. A system for recovering a correct phase clock for an analog video signal that is converted for display on a digital display object having pixels arranged in lines and columns, the analog video signal including an analog video data signal with pixel components being generated at a pixel component frequency, the analog video data signal being generated to produce frames of analog video data, each frame being made up of a plurality of lines of pixel components, with each line having a central active video region made up of activated pixel components and inactive blanked regions made up of inactive pixel components on either side of the central active region, the system comprising:

a pixel clock signal generator for generating pixel clock pulses at a clock frequency that is equal to the pixel component frequency of the analog video signal, the pixel clock pulses sampling values of the analog video signal;

a counter operable to apply consecutive numbers to the pixel clock pulses that sample each line of pixel components;

a pixel component value comparator that identifies a selected pixel component based on a value of the selected pixel component, the selected pixel component having a constant horizontal position from frame to frame;

the counter operable to apply a selected number of the consecutive numbers to a pixel clock pulse that samples the selected pixel component;

a programmable delay device operable to iteratively adjust a phase of the pixel clock pulses for each of a series of frames until the selected number associated with the selected pixel component shifts by one integer to a shifted number, and further until the shifted number shifts back to the selected number;

a memory device operable to consecutively store the selected numbers and shifted numbers of the series of frames;

means for selecting a subseries of frames from the series of frames, the subseries of frames being associated with the shifted number, for selecting a corrected phase setting associated with a frame at the center of the subseries of frames, and for setting the pixel clock pulse phase component to the corrected phase setting.

15. The system of claim 14, wherein the selected pixel component is positioned in the active video region immediately adjacent one of the inactive blanked regions.

16. The system of claim 14, wherein the selected pixel component is a left-hand-most active pixel component.

17. The system of claim 14, wherein the shifted number is one integer greater than the selected number.

18. The system of claim 14, wherein the shifted number is one integer smaller than the selected number.

19. The system of claim 14, wherein the pixel component value comparator is connected to a threshold value register and a pixel value calculator.

20. The system of claim 14, further comprising:

a look-up table containing an expected width E, measured in number of pixel clock pulses, of an expected video image producible by the analog video signal;

a left-hand active pixel status register and a right-hand active pixel status register that respectively determine the horizontal positions of the left-most and right-most pixel components of the active video region;

means for determining an actual width, measured in number of pixel clock pulses, of an actual video image producible by the analog video signal by subtracting the position held in the right-hand status register from the position held in the left-hand status register;

a comparator for comparing the actual width W with the expected width E; and means for automatically adjusting the clock frequency whenever one of $W>E+1$ and $W<E$.

* * * * *